(12) United States Patent
Pulsifer et al.

(10) Patent No.: US 11,522,863 B2
(45) Date of Patent: Dec. 6, 2022

(54) METHOD AND SYSTEM FOR MANAGING RESOURCE ACCESS PERMISSIONS WITHIN A COMPUTING ENVIRONMENT

(71) Applicant: Shopify Inc., Ottawa (CA)

(72) Inventors: Jonathan Pulsifer, Gloucester (CA); Andrew McLeod, East York (CA); Natalie Sheinin, Toronto (CA); Genevieve Luyt, Ottawa (CA)

(73) Assignee: Shopify Inc., Ottawa (CA)

( * ) Notice: Subject to any disclaimer, the term of this patent is extended or adjusted under 35 U.S.C. 154(b) by 81 days.

(21) Appl. No.: 17/084,007

(22) Filed: Oct. 29, 2020

(65) Prior Publication Data
US 2022/0141224 A1    May 5, 2022

(51) Int. Cl.
*G06F 21/00* (2013.01)
*H04L 9/40* (2022.01)
*H04L 47/78* (2022.01)

(52) U.S. Cl.
CPC .......... *H04L 63/101* (2013.01); *H04L 47/781* (2013.01); *H04L 63/0823* (2013.01); *H04L 63/102* (2013.01); *H04L 63/105* (2013.01); *H04L 63/108* (2013.01)

(58) Field of Classification Search
CPC . H04L 63/101; H04L 47/781; H04L 63/0823; H04L 63/102; H04L 63/105; H04L 63/108
See application file for complete search history.

(56) References Cited

U.S. PATENT DOCUMENTS

| | | |
|---|---|---|
| 9,870,454 B2 | 1/2018 | Botti et al. |
| 10,242,214 B2 | 3/2019 | Gadepalli et al. |
| 2006/0048224 A1* | 3/2006 | Duncan ............... G06F 21/6218 726/22 |
| 2006/0156391 A1* | 7/2006 | Salowey ................. H04L 63/20 726/5 |
| 2015/0180894 A1* | 6/2015 | Sadovsky ............. H04W 12/12 726/22 |
| 2016/0224772 A1* | 8/2016 | Moloian ................. G06F 21/31 |
| 2018/0102952 A1* | 4/2018 | Gopalakrishnan .......................... G06F 16/9535 |
| 2021/0125441 A1* | 4/2021 | Ufkes ................ G07C 9/00309 |

* cited by examiner

*Primary Examiner* — Kendall Dolly
(74) *Attorney, Agent, or Firm* — Moffat & Co

(57) ABSTRACT

A computer-implemented method for revoking access permissions to computing resources, the method including retrieving certification rules for a computing resource; receiving information related to a user associated with an access permission for the computing resource; comparing the information with the certification rules to determine compliance with the certification rules; and responsive to determining that compliance with the certification rules fails, revoking the access permission.

24 Claims, 9 Drawing Sheets

Resource: access to database (500)

| | Requirement | Data source |
|---|---|---|
| 1 | User must belong to group {A,B,C} | HR Database |
| | - Or - | |
| 2 | User must have admin privileges in a system | LDAP server |
| | } - And - | |
| 3 | Corporate NDA must be signed | HR database |

FIG. 5

Resource: Admin access to application (400)

| | Requirement | Data source |
|---|---|---|
| 1 | User must belong to group {A,B,C} | HR Database |
| | - And - | |
| 2 | User must have database management training | ABC training Inc. |
| | - And - | |
| 3 | User must be located in North America | Access device |

FIG. 4

METHOD AND SYSTEM FOR MANAGING RESOURCE ACCESS PERMISSIONS WITHIN A COMPUTING ENVIRONMENT

FIELD OF THE DISCLOSURE

The present disclosure is related to access control and, more particularly, to the management of access permissions to resources within a computing system.

BACKGROUND

Obtaining access to computing resources, and subsequently managing such access, is cumbersome. Often, access needs to be granted manually by a system administrator. Further, once such access has been granted, it is often forgotten, and may persist indefinitely, or at least until the access permission for the resource has expired.

However, those with access to a resource may change roles, leave the company or allow qualifications required to access that resource to lapse. In other cases, the requirements to access the resource may change over time. The unexpired permissions to the resource for these individuals lead to ghost rights which may be costly to clean up and may present a security risk.

SUMMARY

In one aspect, a computer-implemented method for revoking access permissions to computing resources may be provided, the method including: retrieving certification rules for a computing resource; receiving information related to a user associated with an access permission for the computing resource; comparing the information with the certification rules to determine compliance with the certification rules; and responsive to determining that compliance with the certification rules fails, revoking the access permission.

In some embodiments, the receiving information may comprise: sending queries to a plurality of data sources for a user associated with an access permission for the computing resource; and receiving responses from the plurality of data sources.

In some embodiments, each response received from the plurality of data sources may be indicative of a state of a particular certification for the user.

In some embodiments, the certification rules may define a set of user certification required for accessing the computing resource.

In some embodiments, the access permission may comprise an expiration time and wherein revoking the access permission may occur prior to expiry of the expiration time.

In some embodiments, the receiving information may comprise receiving a notification from at least one data source indicating a change has occurred.

In some embodiments, the method may be performed periodically.

In some embodiments, the method further may comprise detecting an access attempt to the computing resource.

In some embodiments, at least one of the plurality of data sources may be external to the computing resource.

In some embodiments, the certification rules may comprise user certifications comprising one or more of: a role for the user, a department the user belongs to, team or group the user belongs to; a list of training required for the user; certification required for the user; security clearance required by the user; execution of documents or agreements by the user; prohibition or permission based on a city, region, state, province, or country that the user resides in; or prohibition or permission based on a city, region, state, province, or country that the user is current located in.

In some embodiments, the certification rules may further comprise user device certifications comprising one or more of: a computing device or other company resource needed to gain access to the computing resource; a minimum version of software on the computing device of the user needed to gain access; or a time of day.

In some embodiments, the computing resource may be at least one of: a server, a computing device, a network module, a computing module, a cloud storage, a database, an application, or a repository.

In another aspect, a computing device may be configured for revoking access permissions to computing resources, the computing device including a processor; and a communications subsystem, wherein the computing device is configured to: retrieve certification rules for a computing resource; receive information related to a user associated with an access permission for the computing resource; compare the information with the certification rules to determine compliance with the certification rules; and responsive to determining that compliance with the certification rules fails, revoke the access permission.

In some embodiments the computing device may be configured to receive information by: sending queries to a plurality of data sources for a user associated with an access permission for the computing resource; and receiving responses from the plurality of data sources.

In some embodiments, each response received from the plurality of data sources may be indicative of a state of a particular certification for the user.

In some embodiments, the certification rules may define a set of user certification required for accessing the computing resource.

In some embodiments, the access permission may comprise an expiration time and wherein revoking the access permission may occur prior to expiry of the expiration time.

In some embodiments, the computing device may be configured to receive information by receiving a notification from at least one data source indicating a change has occurred.

In some embodiments, the computing device may be further configured to detect an access attempt to the computing resource.

In some embodiments, at least one of the plurality of data sources may be external to the computing resource.

In some embodiments, the certification rules may comprise user certifications comprising one or more of: a role for the user, a department the user belongs to, team or group the user belongs to; a list of training required for the user; certification required for the user; security clearance required by the user; execution of documents or agreements by the user; prohibition or permission based on a city, region, state, province, or country that the user resides in; or prohibition or permission based on a city, region, state, province, or country that the user is current located in.

In some embodiments, the certification rules may further comprise user device certifications comprising one or more of: a computing device or other company resource needed to gain access to the computing resource; a minimum version of software on the computing device of the user needed to gain access; or a time of day.

In some embodiments, the computing resource may be at least one of: a server, a further computing device, a network module, a computing module, a cloud storage, a database, an application, or a repository.

In a further aspect, a computer readable medium for storing instruction code which, when executed by a processor of a computing device configured for revoking access permissions to computing resources, may cause the computing device to: retrieve certification rules for a computing resource; receive information related to a user associated with an access permission for the computing resource; compare the information with the certification rules to determine compliance with the certification rules; and responsive to determining that compliance with the certification rules fails, revoke the access permission.

BRIEF DESCRIPTION OF THE DRAWINGS

The present disclosure will be better understood with reference to the drawings, in which:

FIG. 4 is a block diagram of a first example of certification rules.

FIG. 5 is a block diagram of a second example of certification rules.

DETAILED DESCRIPTION

Figure 1:
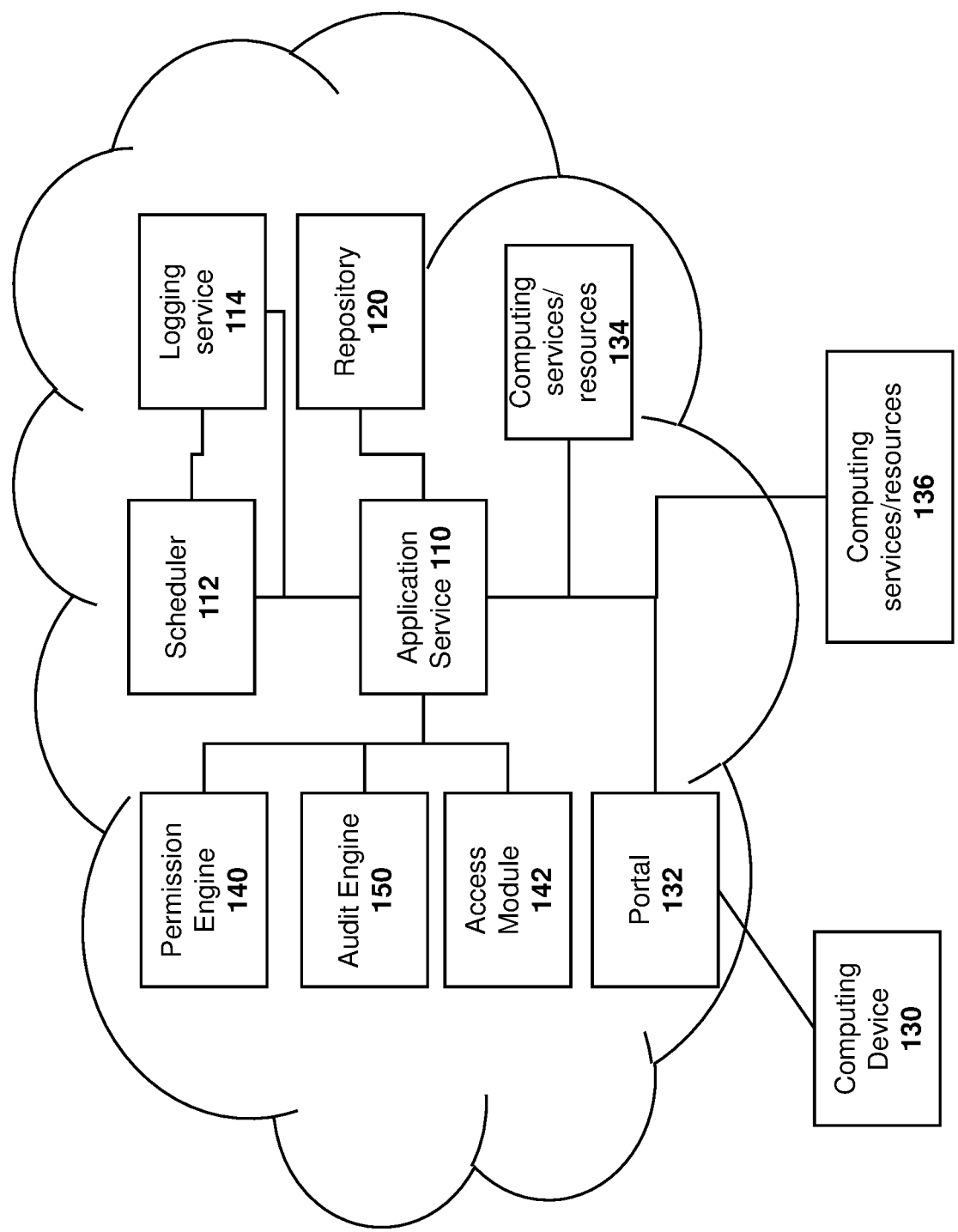
FIG. 1 is a block diagram of an example computing system for use with the embodiments of the present disclosure.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

The present disclosure provides for the management of access permissions to resources within a computing system in order to both grant such access permissions and to audit and expire such access permissions before any pre-set termination date of the rights. This is done by defining a "permit" for each resource within the computing system. A permit is a set of business or certification rules which define the requirements for access to such a resource.

For example, a permit may allow access to a database if the user belongs to a particular department within the company, has completed a database training course, and is located within a certain geographic region. The particular requirements needed for a computing resource may be determined by the resource owner or administrator.

Examples of certification rules can include various qualifications or details about a user, referred to as user certifications. These may include, but are not limited to, a role, a department, team or group an individual belongs to; a list of training that has been completed by the individual; certification for the individual; security clearance for the individual; whether certain documents or attestations have been executed by the individual; a city, region, state, province, or country that the individual resides in; a city, region, state, province, or country that the individual is current located in; among other such criteria.

Further, in addition or instead of user certification rules, equipment or environment rules may apply, referred to as user device certifications. These may include, but are not limited to, a computing device or other company resource that the individual is using while attempting to gain access to the resource; a version of software on an individual's computing device used to gain access; a time of day; among other options.

A resource is any module or feature within a computing system which may need access rights. For example, the resource may be a server, computing device, network module, computing module, cloud storage, database, repository, or software application among other options.

In some cases, the type of access to such a resource may be managed. For example, administrative rights to the resource may be needed and the permit may dictate when such administrative rights are granted. In other cases, deletion of certain data may be restricted and a lease or permission to allow such deletion may be needed. This provides both for security and system safety.

Therefore, in order to access the resource with the desired permission level, an individual could request access to the resource. This may, for example, be done through an Application Program Interface (API) used for such a request. A predefined permit for such resource exists within the computing system, where such permit may be created by the resource owner or administrator.

A computing device acting as a permission engine may obtain the permit requirements for the resource and then may query a plurality of data sources to determine whether the requestor has the necessary requirements to access the resource. For example, if the resource requires that the requestor belong to a certain team, the permission engine may query a Human Resources database to determine whether the requestor belongs to the team. Further the permission engine may then query an external certification resource to determine whether the requestor has a required certification. Other such queries may be made prior to the permission engine granting access permission, also known as a "lease", to the requestor to access the resource. In some cases, the lease may be time limited. In some cases, the lease may provide restrictions on what the requestor is allowed to do with the access permission.

An identity or access management module for the computing resource may then recognize the lease to allow access to the computing resource.

The granting of access permission is based on a snapshot of a set of data at a particular point in time and is therefore transitory. After that time, some of the data may change. In this regard, in some embodiments of the present disclosure an audit engine is provided that can audit existing access permissions to ensure that the certification rules (permits) that the lease is based on are still fulfilled.

In particular, an audit engine may provide an audit of the leases based on various criteria. In one case, a database may note that data for a particular user has changed and may provide a push notification of that fact to the audit engine. For example, if an employee has been terminated, this status may be added to the employee's record in a human resources database, which may then provide a push notification to the audit engine of the change. The audit engine may then review all leases associated with the employee to determine whether to revoke such leases.

In other cases, the audit engine may employ a crawler to find and evaluate leases. This may be done on a periodic or continuous basis in some cases. Therefore, all access permissions within a computing environment may be evaluated at least periodically to ensure the validity of such access permissions.

In still further cases, the audit engine may evaluate access permissions based on an event occurring. For example, the event may be that resource access is requested.

The audit process at the audit engine includes retrieving the certification rules associated with the lease and performing a check for the account associated with the access permissions to ensure such account owner still meets the criteria for the certification rules. This check may involve the sending of queries to the various databases or other data sources associated with the certification rules in the permit to ensure the criteria are met. For example, a query could be sent to the Human Resources database to check the role of the user. A separate query could be sent to a certification database to ensure the user's certification and education are up to date. A third query could be sent to a security database to ensure the security credentials for the user are valid. The type and number of queries will depend on the requirements in the certification rules for desired access level to the computing resource.

Once a response is received from each of the various data sources, the contents of the responses can be compared with the requirements of the certification rules to ensure compliance. If the data in the responses still matches with the criteria for the certification rules, the access permission is allowed to continue.

Conversely, if any of the certification rules within the permit are no longer satisfied, the audit engine can revoke the access permissions. Such revocation would typically occur immediately and override any pre-assigned expiry date of the lease, if such expiry date exists within the lease.

Therefore, the permissions engine and audit engine can manage access to a resource, and provide for clean up of such access automatically, therefore removing update debt and ensuring integrity and security of the system.

In one embodiment, the permissions engine and audit engine may be plugins to an existing platform and be located outside such platform to ensure integrity. Therefore, such engines would run in an outside environment in this case.

Based on the above, the embodiments of the present disclosure could be implemented on any computer system. One example operating environment for the present disclosure is provided with reference to FIG. 1. However, the embodiment of FIG. 1 is merely provided as an example, and different computer environments are possible.

In the embodiment of FIG. 1, application service 110 may control operation of a cloud service. Such application service may include a scheduler 112 as well as a logging service 114. For example, application service 110 may, in some embodiments, create an instance of the configured application in a container when an HTTP request comes in and removes the container when the request has been handled. However, such behavior is optional, and the embodiment of FIG. 1 could be run on any server.

A repository 120 may be used to store various data, including access permissions and/or certification rules as described below. While repository 120 is shown as a single repository in the embodiment of FIG. 1, in other cases a plurality of repositories could exist within a computer system. Further, repository 120 can be located within the environment of the application service 110 in some cases, but could also or instead be located outside of such environment.

A user using a computing device 130 external to the application service 110 may attempt to access a computing service or a resource utilizing a portal 132. The computing service or resource may be internal to the application service, shown with block 134 or external to the application service as shown with block 136. As described above, the resource may be any module or feature within the computing system which may need access rights and include, but is not limited to, a server, computing device, network module, computing module, cloud storage, database, repository, software application, among other options.

If the user associated with computing device 130 has not accessed the resource previously or has no active lease for the resource, then a permission engine 140 may be used to determine whether to grant access permission to the user of computing device 130. The granting of access permissions is described below.

An access module 142 can determine whether the access permission associated with the user would allow access to the computing resource. In the example of FIG. 1, access module 142 is associated with the application service 110. However, in other cases, the access module 142 may be associated with computing services or resources, such as computing services/resources 134 or computing services/resources 136. Further, a plurality of access modules 142 may exist within a system, each associated with a particular computing service/resource.

Further, an audit engine 150 may be utilized to validate access permissions to ensure that the criteria for granting such access permissions still exists.

Each of the portal 132, access module 142, audit engine 150, permission engine 140, repository 120, logging service 114, scheduler 112 and application service 110 can be implemented on a single computing device or on a plurality of computing devices. In some cases, the modules could be distributed over a network.

Further, while the embodiment of FIG. 1 shows cloud services, in other embodiments, the present disclosure could be implemented on a server or a group of servers or computing devices, and therefore the use of the cloud system is not necessary in some cases.

While the embodiment of FIG. 1 shows the application service 110 in the path of communications, in other embodiments a more asynchronous flow is possible.

Figure 2:
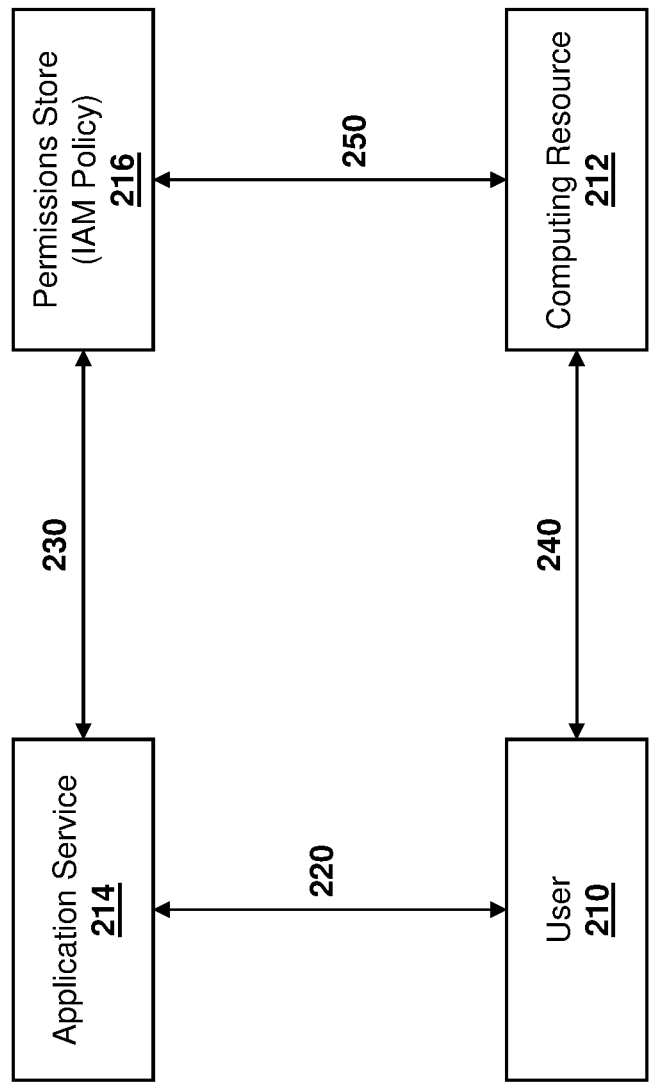
FIG. 2 is a block diagram showing an alternative data flow for the embodiments of the present disclosure.

Reference is now made to FIG. 2, which shows an alternative embodiment for a computing system.

In the embodiment of FIG. 2, a user 210 wishes to access a computing resource 212. In this case, the user may provide a request to the application service 214, shown with arrow 220.

In response to the request, application service 214 may grant a lease or permissions by writing to an external permissions store 216, shown with arrow 230. In one case, the external permission store may be an Identity and Access Management (IAM) policy store.

Subsequently, the user 210 may request access to the computing resource 212, shown with arrow 240. The computing resource 212 may then access the permissions store 216 to check the permissions for the user, as shown with arrow 250.

Other options for computing systems are also possible.

Granting Access Permissions

In one aspect of the present disclosure, a user may wish to access a computing resource. Further, in some cases, the user may wish to have specific permission levels or specific rights for such computing resource. For example, in some cases the user wishes to receive administrator access to the computing resource. In other cases, the user wishes to receive credentials that allow the user to add, change or delete data. Other types of permission levels would be known to those skilled in the art.

When a computing resource is created or brought within the present system, criteria to access such resource may be defined. Further, in some cases the criteria may be changed over time. This can be done, for example, by utilizing certification rules for the computing resource. A particular resource could have one or a plurality of certification rules defined in order to grant access permission. Further, in some cases a computing resource could have different certification rules depending on the type or level of access that a user desires for such computing resource.

Figure 3:
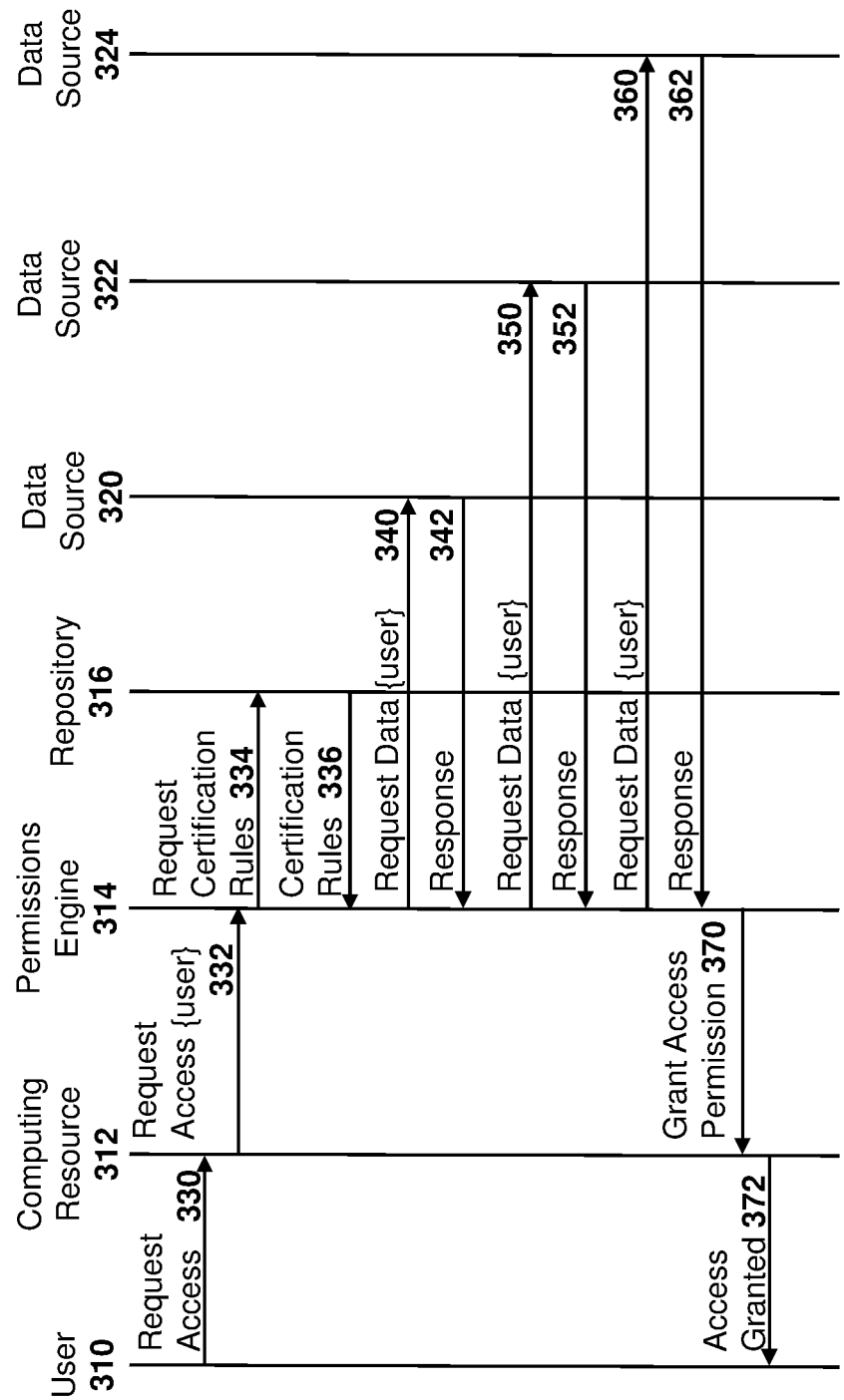
FIG. 3 is a data flow diagram showing a process for allocating access permissions to a user.

Therefore, referring to FIG. 3, a user 310 may seek access to a computing resource 312. In this regard, the user 310 may request access, as shown with message 330, to computing resource 312.

As will be appreciated by those in the art, the request of message 330 may not be sent directly to the computing resource, but may rather be through an intermediary. In this case, the access request message 330 would be to a separate entity.

If access permission for the user does not exist, the access request is then passed from computing resource 312 to the permission engine 314 indicating that a request for access for a particular user is being made. This is done for example, in message 332.

The permission engine 314 may then request to obtain the certification rules for the computing resource, for example from a repository 316. The request is shown as message 334.

In response, the repository 316 returns the certification rules in message 336 to permission engine 314.

The certification rules could take the form of any list or table of requirements to access the resource. Further, in some cases the permission level or rights may be part of the request.

For example, reference is now made to FIG. 4, which shows a first example set of certification rules 400. In the example of FIG. 4, the request is to access an application with administrator rights.

In the example of FIG. 4, three sets of rules are provided. A first is that the user must belong to a particular group. For example, the user must be in group A, B or C. Further, the certification rules include a data source that the permission engine can use to verify this data. For example, in the example of FIG. 4 this is a human resources database. The data source may be any address, network location, universal resource indicator (URI), uniform resource location (URL), or pointer that provides a link to a data source.

A second rule in the example of FIG. 4 is that the user must have database management training. The data source in this case is an external company which may include a database that can be queried to determine whether the user has the requisite training.

The third criteria for the certification rules of FIG. 4 is that the user must be located in North America. In this case, the data source to be used by the permissions engine may be the user device.

Further, in the example of FIG. 4, the three criteria are all separated with an "and", indicating that all three criteria must be met in order to have the administrative access to the application granted for that particular user.

In a second example shown with FIG. 5, a user is requesting access to a database. The certification rules 500 for access to the database indicate that the user must belong to a particular group for which the data source is an HR database or the user must have administrative privileges in the system, for which the data source is a Lightweight Directory Access Protocol (LDAP) server. In this case, the two criteria are separated with an "or" indicating that one of the two criteria must be met.

A third criteria in FIG. 5 is that the corporate Non-Disclosure Agreement (NDA) must have been signed, which may be a field within an HR database. This criteria is added with an "and" and the first two criteria are in brackets, indicating that one of the first two criteria, along with the third criteria, must be met.

The example of FIG. 4 and FIG. 5 above indicate three criteria in order to access a resource. However, this number is not limiting and in some cases fewer and in some cases more criteria could be needed to access the resource.

Further, the logic string for the criteria could be defined as any type of logic string. In this case, only "AND" or "OR" examples are shown. However, in other cases, operators such as NOT, "exclusive or (XOR), not or (NOR), not and (NAND), among other options could equally be used in creating the logic string for the certification rules. The string can comprise any form, such as ("a" AND "b" AND "c") as in FIG. 4, or (("a" AND ("b" OR "c")) from FIG. 5, but could consist of as many or few terms as needed, and could include certain logic being determined first, for example as shown in brackets, before other logic is determined. Further, in some cases, non-Boolean logic could also be used. Therefore, the present disclosure is not limited to any particular form of the certification rules and the rules of FIGS. 4 and 5 are merely provided as examples.

The certification rules of FIG. 4 or FIG. 5 could be created when the computing resource is brought into a computing system, or may be created or updated subsequent to this. For example, a cloud system may have an application program interface to create and update certification rules for a particular computing resource, which may be maintained by an owner or administrator of such resource.

Referring again to FIG. 3, once the permission engine 314 has the certification rules, it can find the data sources required to verify the criteria found in the certification rules. In the example of FIG. 3, three data sources are identified. In this case, the permission engine 314 can send a request for data about a particular user to the first data source 320, as shown with message 340. A response to the query of message 340 is received as message 342.

Similarly, the permission engine 314 can send a request for data about the user to a second data source 322, shown with message 350, and receive a response 352 back.

Similarly, the permission engine 314 can send a third request regarding the user to data source 324, as shown with message 360, and receive a response 362 back.

While the embodiment of FIG. 3 includes only three requests, more or fewer data sources may be employed based on the certification rules. Further, a particular data source may be consulted more than once in some cases, and/or may provide multiple pieces of data for each request.

Once permission engine 314 has received all of the data from the plurality of data sources, it can compare the received data with the requirements for the certification rules received in message 336. If all the criteria are met, then the permission engine 314 can grant access permission. In this case, the permission engine 314 can generate a "lease" or access permission which may be stored, for example, in a repository 316 or other similar repository.

Further, the access permission can optionally be signalled to the computing resource 312, as shown with message 370 and the computing resource can, in some cases, signal to the user in message 372 that access to the resource was granted.

Thereafter, an access module such as access module 142 from FIG. 1 may obtain the access permission and grant the user access into the particular computing resource.

Figure 6:
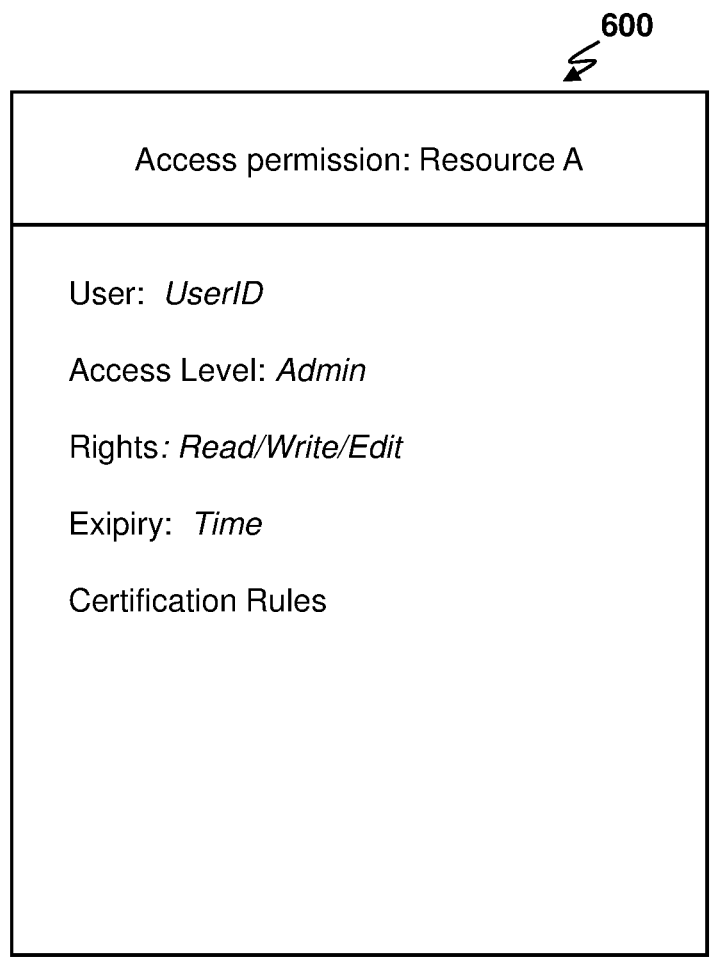
FIG. 6 is a block diagram of an example of access permissions.

For example, an access permission 600 for a computing resource "A" is shown with regard to FIG. 6. Access permission 600 can include various data including user identification, the access level, user rights or permissions, an expiry time, as well as in some cases a copy of the certification rules used to generate the access permission. This list of the data included in the access permission is merely provided as an example. Other data could also be included in the access permission including unique codes or keys, permission limitations, permission criteria, among other options. For example, permission criteria may indicate that the permission will be granted only if the user is using a computer associated with the company. In this case, the access engine could do a check prior to allowing access to the resource that the user is logged into the company computer. Further, the list of access permissions in FIG. 6 could be reduced and merely include a subset of the data illustrated in FIG. 6. Other options are possible.

While the embodiment of FIG. 6 shows a single access permission for all computing resources, in some cases, the access permission may be dependent on the computing resource for which the access permission pertains and/or may be dependent on the access module being used to provide access to such computing resource. In particular, the access permission may need to be tailored to the particular computing resource for which the access permission is granted.

Further, in some cases a user may be granted multiple access permissions for a single computing resource. For example, the user may wish to access the computing resource with administrative privileges for one purpose but may wish to access the computing resource with normal user privileges for a second purpose. In this case, two access permissions may exist for such user, depending on the desired functionality a user needs when accessing such computing resource.

Further, as described above, the granting of access permissions may be based on a snapshot of data at a particular point in time, and is therefore transitory. After that time, some data may change. In this regard, an audit engine, such as audit engine 150 from the embodiment of FIG. 1, may periodically review and revoke access permissions. In this way, access permissions may be maintained up-to-date and potentially costly cleanup of stale access permissions may be avoided. For example, while without the subject matter of the present application there may be a need to periodically manually audit access permissions, by employing an audit engine, requirements for such manual audits of audit permissions may be avoided or limited.

The audit engine may review the access permissions in a variety of ways. In a first embodiment, described with regard to FIG. 7, the audit engine may receive push messages from various data sources indicating a change in data which may affect access permissions. The audit engine could review any access permissions for which that piece of data pertains, and revoke access permissions as needed.

In a second embodiment, the audit engine may periodically review access permissions found within a computer system to determine whether such access permissions are still valid, and may revoke access permissions when the conditions for granting such access permission no longer exist. This is shown with regards to FIG. 8.

In a third embodiment, the audit engine may review access permissions for a computing resource when an event occurs, such as when a user is attempting to log into or access such resource. In other cases, the event may be detection of unusual activity by a user. Other options for the event are possible. An example of the event being a user login is shown below with regard to FIG. 9.

Figure 7:
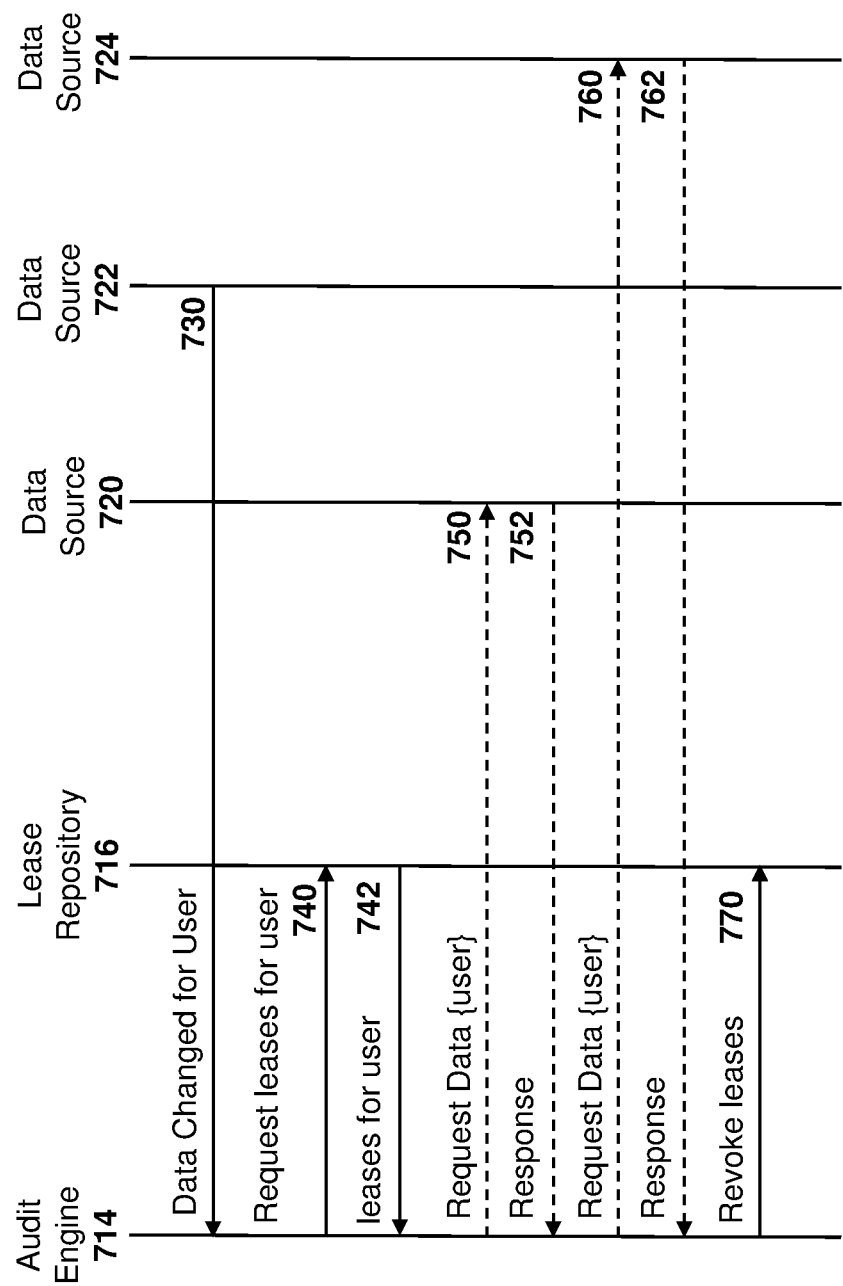
FIG. 7 is a data flow diagram showing a process for auditing access permissions to a user based on a notification from a data source.

Reference is now made to FIG. 7. In the embodiment of FIG. 7, audit engine 714 discovers that an access permission may be out of date based on a notification from a data source. In particular, an audit engine 714 communicates with a lease repository 716 which stores access permissions or leases for a particular computing resource. Further, three data sources, namely data source 720, data source 722 and data source 724 are shown.

In the example of FIG. 7, a data source 722 registers that data has changed. For example, the data change may include the expiry of a credential which had a time limit, a change in the role, position, or employment status of the user, a change in a security level for a user, among other options.

Data source 722 in this case has programming that indicates that a change in a user field may need to be signalled to audit engine 714, and therefore message 730 is sent from the data source 722 to audit engine 714 indicating that data has changed for a user.

Subsequently, audit engine 714 may request any valid access permissions for the user in message 740 from the lease repository 716. As will be appreciated by those in the art, lease repository 716 could be a single lease repository or could be a plurality of lease repositories.

In response to message 740, the audit engine 714 obtains the leases or access permissions for the user, as shown with response 742.

The audit engine 714 may then review each of the access permissions. In the embodiment of FIG. 7, the review is shown for a single access permission. However, the process could be repeated for all access permissions received in response 742.

If the access permissions include the certification rules used to grant such access permission, this may be sufficient for audit engine 714 to make a determination. Otherwise, audit engine 714 may query a repository with the certification rules to obtain the relevant certification rules for a particular computing resource (not shown).

In some cases, the information from message 730 may be sufficient to revoke the lease for the user. In particular, if the criteria from a data source 722 is essential for the access permission and the data has now changed to indicate that the user no longer meets the criteria, then the access permissions can be revoked immediately.

In other cases, audit engine 714 still needs to obtain data from one or more of the plurality of other data sources in order to determine whether the requirements in the certification rules for the computing resource are still met. This is shown, for example, with message 750 in which the audit engine 714 requests data for the user from data source 722. A response 752 is then provided back from data source 722 to audit engine 714.

Similarly, the audit engine 714 may request the data for the user from data source 724, as shown with message 760 and a response 762 is received back from data source 722.

Messages 750, 752, 760 and 762 are optional if such data does not need to be acquired in order to revoke the lease.

Based on the received data in messages 730 and potentially message 752 and 762, the audit engine 714 can make a determination of whether the certification rules are still met. If not, the audit engine 714 may immediately revoke the access permissions, shown with message 770.

The example of FIG. 7 shows three data sources. However, this is not limiting and in other cases more or less data sources could be queried in order to determine whether the certification rules are met. Further, a particular data source may be consulted more than once in some cases, and/or may provide multiple pieces of data for each request.

Figure 8:
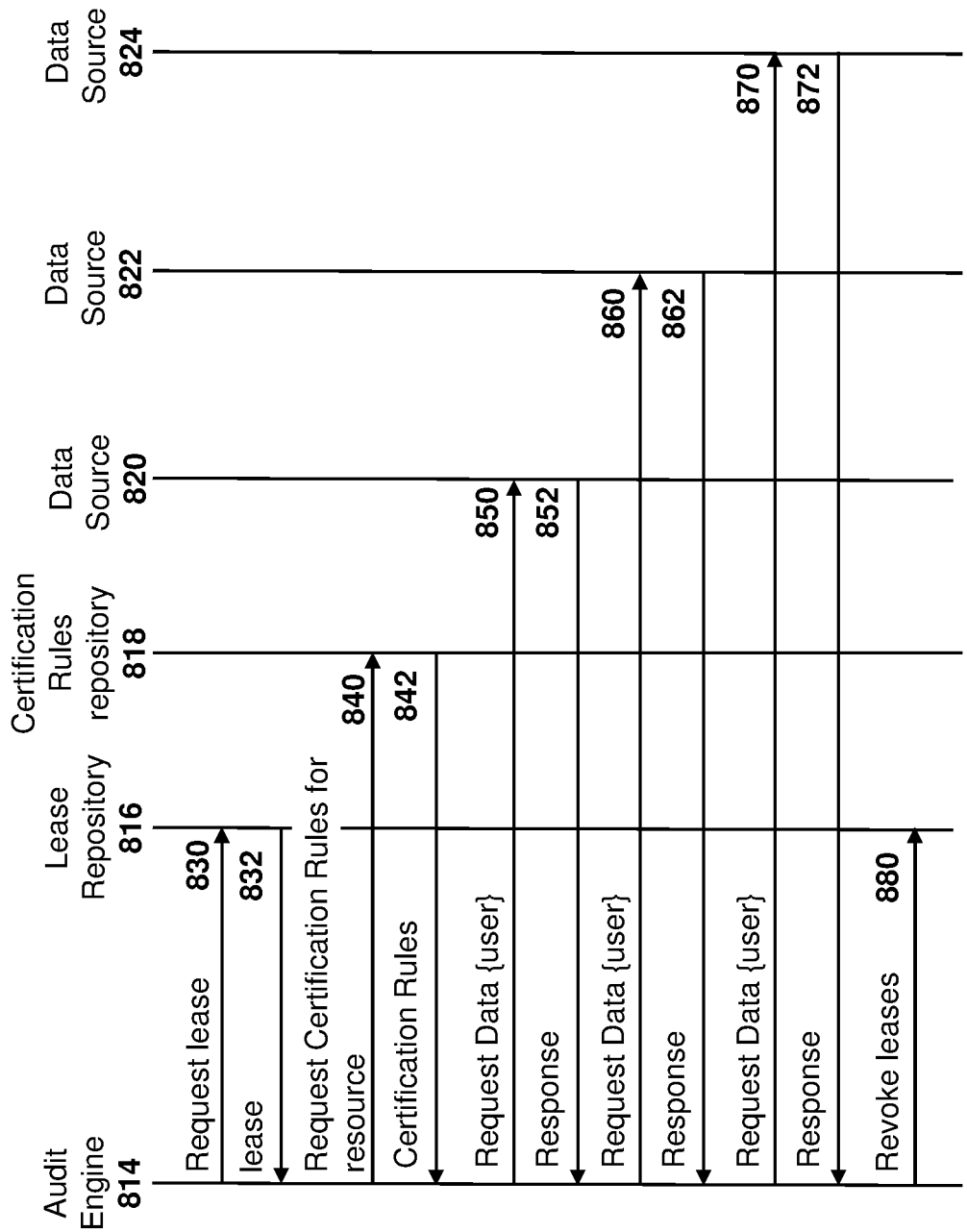
FIG. 8 is a data flow diagram showing a process for auditing access permissions to a user based on polling of data sources.

Reference is now made to FIG. 8. The embodiment of FIG. 8 refers to the case where the audit engine performs a periodic review of the access permissions in order to ensure that such access permissions are still valid. In other cases, the embodiment of FIG. 8 could also be used in cases where the certification rules for a particular resource have changed and the audit engine needs to make sure that the current leaseholders meet the new lease requirements. In still further cases, if a first lease or permit is provided and subsequently an updated lease or permit with better permissions is provided, the audit engine could also review and flag such cases. Other options are also possible.

The periodic scanning of the leases can be done on a continual basis, periodically, or based on an administrator command, among other options. In the example of FIG. 8, an audit engine 814 communicates with a lease repository 816 in order to obtain access permissions. Lease repository 816 may be a single lease repository or may involve a plurality of lease repositories in some computing systems.

Further, in some cases the audit engine 814 may optionally communicate with a certification rules repository 818. Certification rules repository 818 may be a single repository or may consist of a plurality of repositories. Such repository stores the certification rules needed for access to a particular resource Further in the embodiment of FIG. 8, three data sources are shown, namely data source 820, data source 822 and data source 824.

An audit engine 814 may request one or more leases from a lease repository in message 830 and receive the one or more leases as message 832.

For each lease or access permission, if the access permission does not include the certification rules that were used for requesting such access permission, then the audit engine 814 may request the certification rules for the computing resource from the certification rules repository 818, as shown with message 840 and receive such certification rules back in message 842.

Subsequently, audit engine 814 could look at the certification rules and request the data for the user from the various data sources that are included in the certification rules. In the embodiment of FIG. 8, this is shown with a request for data for the user to data source 820, shown with request 850. A response 852 is provided back from data source 820 to the audit engine 814 based on request 850.

Similarly, the audit engine 814 may request data for the user from data source 822 in request 860 and receive a response 862 in return.

The audit engine 814 may further request data for a user from data source 824, as shown with request 870 and receive a response 872 in return.

Once the data from all of the data sources is received, the audit engine 814 may then compare the received responses with the requirements of the certification rules as received in message 842 or as part of the access permissions data received in message 832, and make a decision on whether the credentials for the user are still valid. If yes, then the audit engine could move to the next lease to review. If not, then the audit engine 814 may immediately revoke the lease, as shown with message 880.

Figure 9:
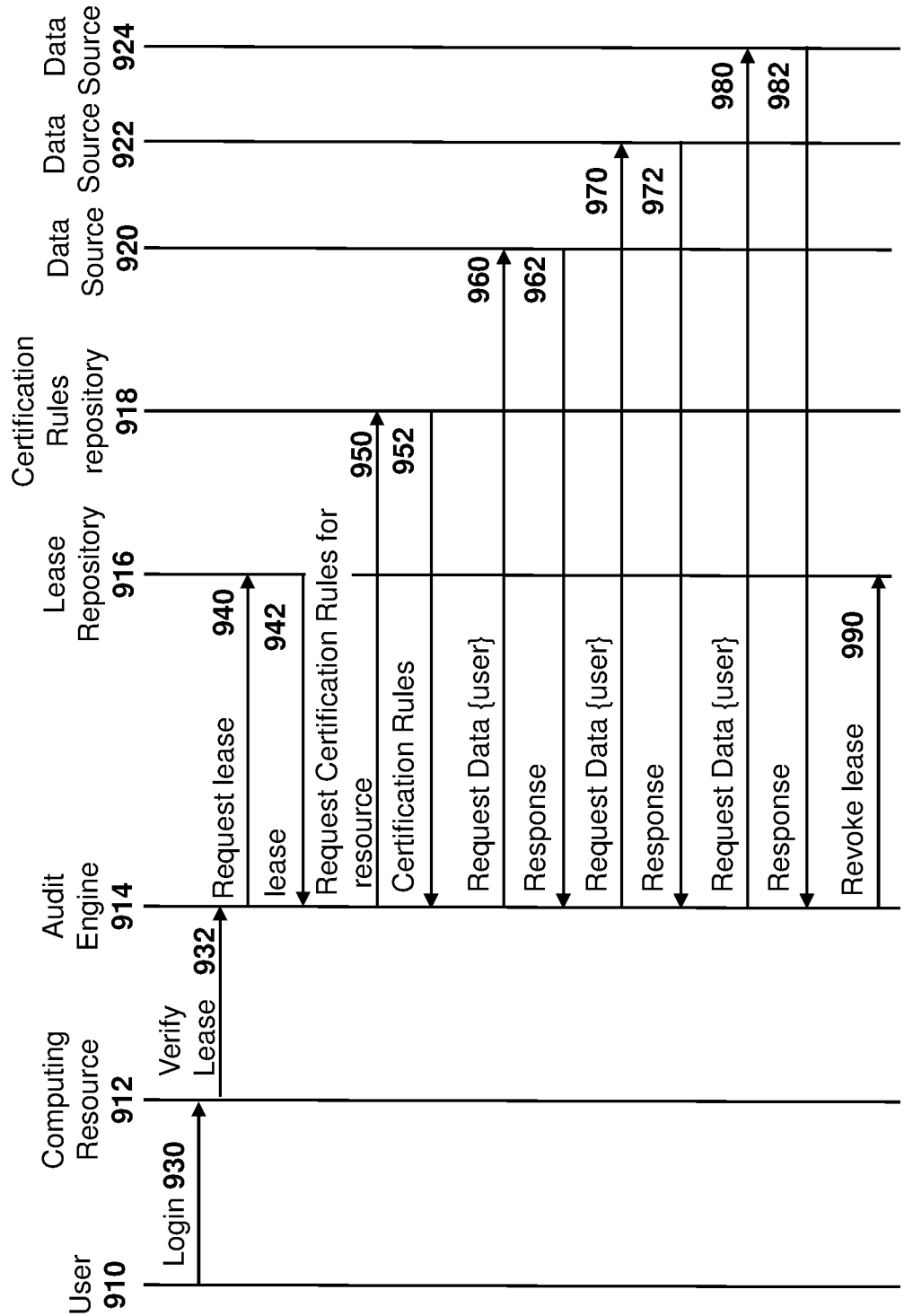
FIG. 9 is a data flow diagram showing a process for auditing access permissions to a user based on an event occurrence.

In yet another embodiment, the checking of the access permission is done based on an event. Reference is now made to FIG. 9, which shows an example where the event is a login or access attempt by a user.

In particular, in the embodiment of FIG. 9, a user 910 communicates with a computing resource 912 and tries to login or access the resource, as seen by message 830. In this case, the computing resource 912 may verify the access permissions, as shown with message 932 to audit engine 914.

Audit engine may communicate with a lease repository 916 and a certification rules repository 918 to obtain the lease and check the certification rules. In particular, the audit engine 914 may request the access permissions for the user for the computer resource in message 940 and receive the lease or access permission in message 942. In some cases, the access permission received in message 942 will include the certification rules for the computing resource. However, if not, the audit engine 914 can request the certification rules for the resource from the certification rules repository 918, as shown with message 950. In response, certification rules may be provided to the audit engine 914 in message 952.

The audit engine 914 may then go to the various data sources to determine whether the user still meets the certification rules. In particular, the audit engine 914 may request the data about a user from a data source 920, shown with request 960, and receive a response in message 962.

Further, the audit engine 914 may request the data about a user from data source 922, as shown with request 970, and receive response 972.

Further, the audit engine 914 may request the data about a user from data source 924, as shown with request 980, and receive a response 982.

The number of data sources queried would depend on the certification rules for the particular computing resource.

Based on the responses received from the various data sources, the audit engine 914 could check to see whether the user still meets the certification rules for the particular computing resource and, if not, the audit engine 914 could revoke the lease as shown with message 990.

A computing system may perform any one or more of the processes of FIG. 7, 8 or 9. Specifically, a computing system may both receive push notifications from data sources, as well as perform periodic audits of access permissions in some cases, and therefore implement the embodiments of FIGS. 7 and 8. In other cases, the system may check the access permissions when a user is logging in and may also perform periodic checks to find access permissions that are not being used, therefore implementing the processes of FIGS. 8 and 9. In still further cases, the computing system could implement any of the embodiments of FIG. 7, 8 or 9 alone or together. Other combinations of these processes are possible.

Therefore, based on the embodiments of FIGS. 3 and 7-9, the permissions engine and audit engine can grant access to a computing resource and provide for cleanup of such access automatically, thereby ensuring integrity and security in a computing system.

The permission engine, audit engine, access module, application service, logging service, and computing resources may be implemented on any type or combination of computing devices. For example, one simplified computing device that may perform the embodiments described above is provided with regards to FIG. 10.

Figure 10:
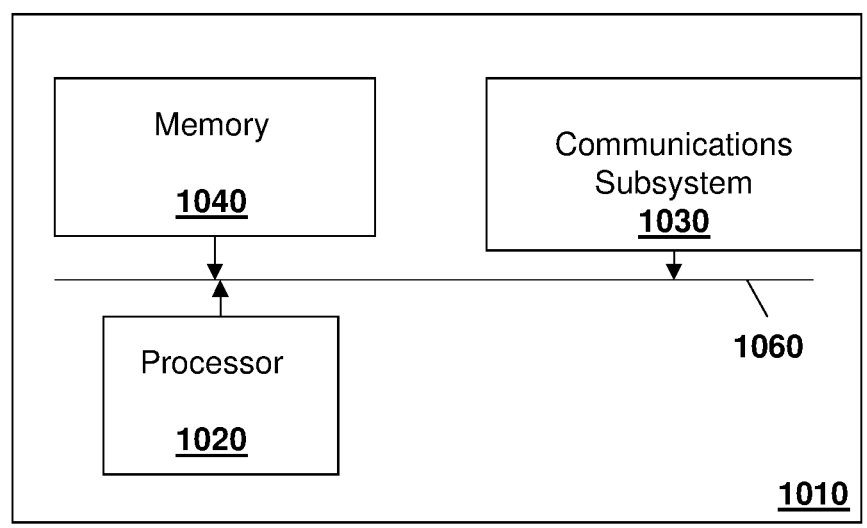
FIG. 10 is a block diagram of an example simplified computing device capable of implementing the embodiments of the present disclosure.

In FIG. 10, computing device 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the computing device 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the computing device 1010 may access data or programmable logic from an external storage medium, for example through the communications subsystem 1030.

The communications subsystem 1030 allows the computing device 1010 to communicate with other devices or network elements.

Communications between the various elements of the computing device 1010 may be through an internal bus 1060 in one embodiment. However, other forms of communication are possible.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for revoking access permissions to computing resources, the method comprising:
retrieving certification rules for a computing resource;
receiving updated information related to a user associated with an access permission for the computing resource, the receiving updated information comprising:
sending queries to a plurality of data sources for data on a user associated with an access permission for the computing resource; and
receiving responses from the plurality of data sources;
comparing the updated information with the certification rules to determine compliance with the certification rules; and
responsive to determining that compliance with the certification rules fails, revoking the access permission.

2. The method of claim 1, wherein each response received from the plurality of data sources is indicative of a state of a particular certification for the user.

3. The method of claim 1, wherein the certification rules define a set of user certification required for accessing the computing resource.

4. The method of claim 1, wherein the access permission comprises an expiration time and wherein revoking the access permission occurs prior to expiry of the expiration time.

5. The method of claim 1, wherein the receiving updated information comprises receiving a notification from at least one data source indicating a change has occurred.

6. The method of claim 1, wherein the method is performed periodically.

7. The method of claim 1, further comprising detecting an access attempt to the computing resource.

8. The method of claim 1, wherein at least one of the plurality of data sources is external to the computing resource.

9. The method of claim 1, wherein the certification rules comprise user certifications comprising one or more of: a role for the user, a department the user belongs to, team or group the user belongs to; a list of training required for the user; certification required for the user; security clearance required by the user; execution of documents or agreements by the user; prohibition or permission based on a city, region, state, province, or country that the user resides in; or prohibition or permission based on a city, region, state, province, or country that the user is current located in.

10. The method of claim 9, wherein the certification rules further comprise user device certifications comprising one or more of: a computing device or other company resource needed to gain access to the computing resource; a minimum version of software on the computing device of the user needed to gain access; or a time of day.

11. The method of claim 1, wherein the computing resource is at least one of: a server, a computing device, a network module, a computing module, a cloud storage, a database, an application, or a repository.

12. A computing device configured for revoking access permissions to computing resources, the computing device comprising a memory for storing instructions and a processor configured to execute instructions to:
retrieve certification rules for a computing resource;
receive updated information related to a user associated with an access permission for the computing resource by:
sending queries to a plurality of data sources for data on a user associated with an access permission for the computing resource; and
receiving responses from the plurality of data sources;
compare the updated information with the certification rules to determine compliance with the certification rules; and
responsive to determining that compliance with the certification rules fails, revoke the access permission.

13. The computing device of claim 12, wherein each response received from the plurality of data sources is indicative of a state of a particular certification for the user.

14. The computing device of claim 12, wherein the certification rules define a set of user certification required for accessing the computing resource.

15. The computing device of claim 12, wherein the access permission comprises an expiration time and wherein revoking the access permission occurs prior to expiry of the expiration time.

16. The computing device of claim 12, wherein the computing device is configured to receive updated information by receiving a notification from at least one data source indicating a change has occurred.

17. The computing device of claim 12, wherein the computing device is further configured to detect an access attempt to the computing resource.

18. The computing device of claim 12, wherein at least one of the plurality of data sources is external to the computing resource.

19. The computing device of claim 12, wherein the certification rules comprise user certifications comprising one or more of: a role for the user, a department the user belongs to, team or group the user belongs to; a list of training required for the user; certification required for the user; security clearance required by the user; execution of documents or agreements by the user; prohibition or permission based on a city, region, state, province, or country that the user resides in; or prohibition or permission based on a city, region, state, province, or country that the user is current located in.

20. The computing device of claim 19, wherein the certification rules further comprise user device certifications comprising one or more of: a computing device or other company resource needed to gain access to the computing resource; a minimum version of software on the computing device of the user needed to gain access; or a time of day.

21. The computing device of claim 12, wherein the computing resource is at least one of: a server, a further computing device, a network module, a computing module, a cloud storage, a database, an application, or a repository.

22. A non-transitory computer readable medium for storing instruction code which, when executed by a processor of a computing device configured for revoking access permissions to computing resources, cause the computing device to:
retrieve certification rules for a computing resource;
receive updated information related to a user associated with an access permission for the computing resource by:
sending queries to a plurality of data sources for data on a user associated with an access permission for the computing resource; and
receiving responses from the plurality of data sources;
compare the updated information with the certification rules to determine compliance with the certification rules; and
responsive to determining that compliance with the certification rules fails, revoke the access permission.

23. The non-transitory computer readable medium of claim 22, wherein each response received from the plurality of data sources is indicative of a state of a particular certification for the user.

24. The non-transitory computer readable medium of claim 22, wherein the certification rules define a set of user certification required for accessing the computing resource.

* * * * *